United States Patent

Arnoux

[15] 3,657,484

[45] Apr. 18, 1972

[54] DIALING SYSTEMS

[72] Inventor: Michel Arnoux, Verrieres-Le-Buisson, France

[73] Assignee: C.I.T.-Compagnie Industrielle des Telecommunications, Paris, France

[22] Filed: Mar. 6, 1970

[21] Appl. No.: 17,208

[30] Foreign Application Priority Data

Mar. 6, 1969 France ................................6906319

[52] U.S. Cl. ............................................179/16 AA, 179/86

[51] Int. Cl. ........................................................H04m 3/00

[58] Field of Search .................179/16 R, 16 A, 16 AA, 84 R, 179/84 A, 84 SS, 86, 88, 90 K

[56] References Cited

UNITED STATES PATENTS 3,330,914 7/1967 Herter ....................................179/86

*Primary Examiner*—Ralph D. Blakeslee
*Attorney*—Craig, Antonelli & Hill

[57] ABSTRACT

The object of the invention is a device for composing a number by means of a keyboard, by impedance variation.

The lines are classified according to at least three categories of impedance, the system comprising means determining first the category of line measured or the zone and carrying out this measurement of the line impedance as soon as the device comprising measuring apparatus corresponding to the impedance zones and working in parallel, each measuring apparatus comprising comparators adapted respectively to the various categories of lines.

10 Claims, 5 Drawing Figures

DIALING SYSTEMS

The invention concerns apparatus for registering a code transmitted to it from an external circuit on one of a system of incoming lines, the code being transmitted by modulation of the line current by varying the value of a coder impedance presented to the line by the external circuit, and identified by monitoring the line current in the apparatus.

The invention is particularly, but not exclusively, suitable for use in the exchange of a communication network in which coding is carried out by impedance variation using a keyboard. Systems in which coding is carried out by impedance variation and using keyboard dialing devices have been proposed, and generally such devices are designed for relatively small, even experimental, networks resulting in relatively complicated and expensive exchange equipment. In exchanges of high capacity, where the equipment must be multiplied to cope with the increased line capacity, the solutions may be economically disadvantageous.

The principle of coding by impedance variation will be briefly described with reference to a telephone system in which the dialing codes are transmitted by this method. When a subscriber wishes to make a call, he picks up his handset, and is connected by his telephone line and pre-selector circuitry to a receiver in the exchange which transmits to the subscriber the dialing tone and connects his line to a direct current supply. The subscriber then composes the call-code of the subscriber he is calling, by successively pressing the keys of a dialing keyboard, each key being indexed with one of the digits used in making up the code. The actuation of each key connects across the line a pair of impedances each consisting of a resistance connected in series with a diode, the two diodes being oppositely orientated. The values of these two resistances are always higher than the resistance of the handset, so that operation of a key results in a reduction of the line current. The reduction in current depends on the sense in which the line current flows, since for each current flow direction, only one of the resistances plays a part.

The reduction in current is detected in the exchange which provides an indication of the first resistance with the line current flowing in the first sense, and then reverses the line current to provide a measure of the second resistance. Each digit of the code is thus represented by the values of a pair of resistances, these values being varied to provide as many digits as are necessary. The values of the resistances must be contained between two limits; the operation of a key must provide a significant drop in line current, but most not offer the possibility of confusion with the handset being replaced. It is thus necessary that the line current controlled by each resistance must be less than the supply current to the handset in its ready condition and greater than the current due to losses in the line when the handset is hung up.

For numerical codes, two groups each of four resistances are sufficient to provide the necessary ten digits, the four values of each group can be the same. The symmetry of the two groups of resistances presented for successive measurements rendering the order in which they are measured irrelevant. Generally, if the variations of line resistance and the line losses are taken into account, it is virtually impossible to discriminate between four resistance values inserted in the subscriber's instrument.

In order to carry out this discrimination with maximum reliability, it is necessary to carry out a preliminary measurement of the line resistance, and either to introduce a compensation element, or to interpret the results obtained appropriately. In these conditions, the discrimination of the four resistance values is possible. To ensure correct operation of the exchange receiver, it is necessary that the line currents corresponding to the various resistance values do not overlap, even in the case of the extreme variations of line resistance and line losses. It is thus important to determine, for each resistance value, the limiting values of the line current in the extreme cases, that is to say in one case with the maximum line resistance and no losses, and in the other case the minimum line resistance and maximum losses. Since the insertion of the same resistance value has a much greater effect in a short line than in a long line, the discrimination process must be adapted to the length of line treated.

In accordance with a broadest aspect of the invention there is provided apparatus for registering a code transmitted to it from an external circuit on one of a system of incoming lines, the code being transmitted by modulation of the line current by varying the value of a coder impedance presented to the line by the external circuit, and identified by monitoring the line current in the apparatus, the apparatus including: an input circuit connected to the line to sense and indicate the instantaneous line current; a discriminator assembly including at least three discriminators connected to the input circuit to indicate a preselected current range in which the indicated line current lies with a zero coder impedance value and thus significant of the line impedance; a selector connected to the discriminator assembly and arranged to select a discriminator of the assembly in accordance with the line current range indicated with the zero coder impedance value, the selected discriminator then indicating a preselected current range in which the line current lies with each of a number of further coder impedance values; and a decoder connected to the discriminator assembly and arranged to detect the code from the current ranges indicated by the selected discriminator.

In accordance with a narrower aspect of the invention there is provided exchange equipment for a telecommunications network in which call-codes are transmitted by impedance variation from keyboards of the network subscribers, each key of a subscriber keyboard being associated with a pair of impedances successively connectable into the line to provide two successive, oppositely directed and undirectional line currents whose values depend on the impedance values and provide a coded indication of a code digit represented by the key, the subscriber keyboards being connected to the exchange equipment through lines each having an impedance lying within one of at least three preselected ranges, the exchange equipment including means for carrying out a preliminary determination of the line impedance range after the subscriber's handset is lifted but before the call-code is composed by the subscriber, and measuring elements corresponding to the line impedance ranges and operating in parallel, each measuring element including comparators respectively adapted to the different line categories.

The invention will now be described in more detail, by way of example only, with reference to the accompanying diagrammatic drawings, in which.

Brief reference will first be made to FIG. 5, in order to facilitate comprehension of the explanation of FIGS. 1 to 4, but FIG. 5 will be described in more detail below, once its component elements have been described.

Figure 5:
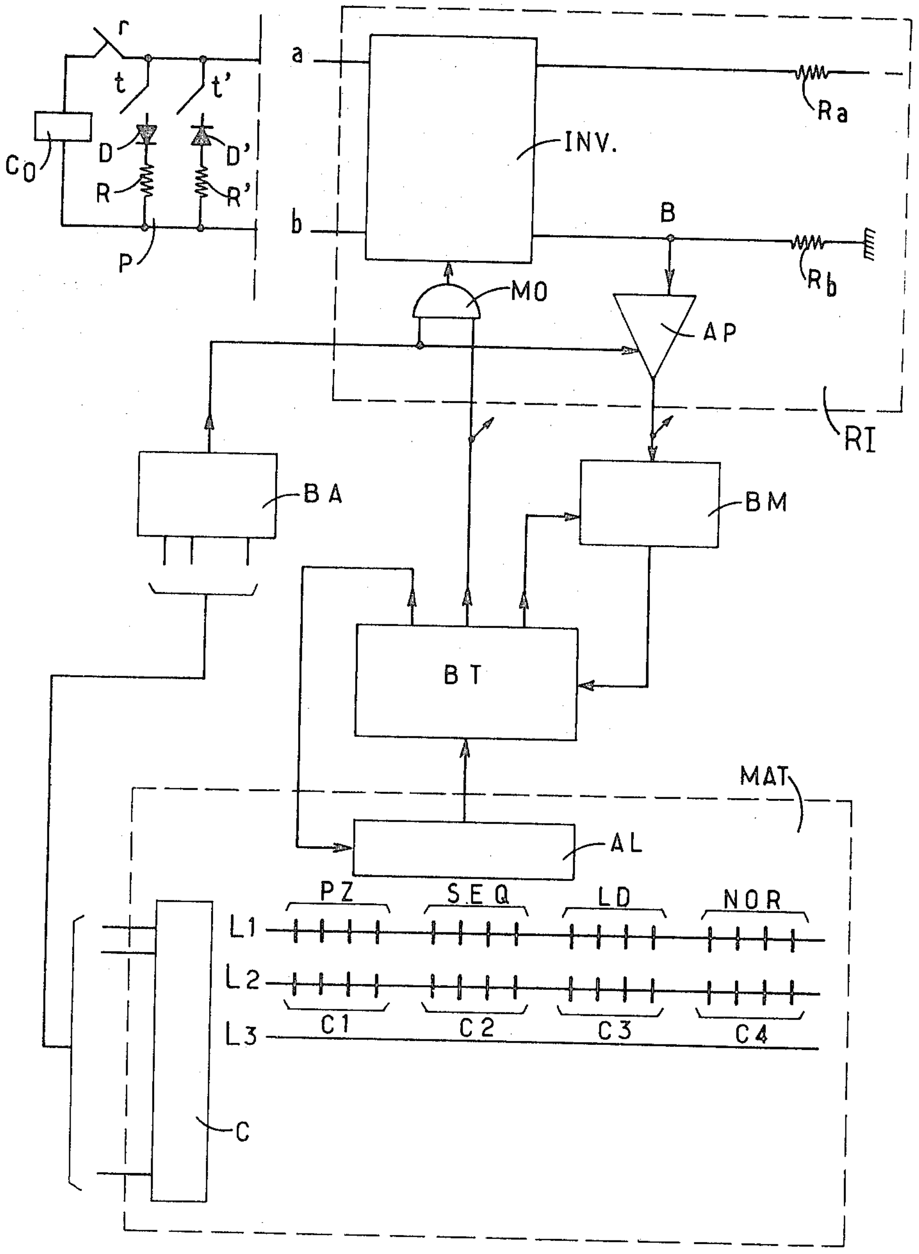
FIG. 5 is a block diagram of the apparatus for registering a code.

FIG. 5 shows, to the left of the vertical dotted line, a telephone subscriber unit P having a handset $C_0$. The unit P is linked to the exchange by a line having two wires *a* and *b*, the line passing through pre-selector circuitry (not shown) before arriving at an input circuit RI of the apparatus for registering a code transmitted on the line. The input circuit RI can be linked, by means of the pre-selector circuitry to a large number of subscriber units, the number of input circuits provided in the exchange suitably being equal to the maximum number of conversations which can take place at any one time. The number of input circuits RI is thus very much less than the number of subscriber units such as P. The line is supplied with direct current by the exchange, through resistances $R_a$ and $R_b$. The current is applied to the line through an invertor switch INV which can be operated to reverse the direction of current flow in the line. The invertor INV is controlled by a monostable circuit MO.

When the subscriber of unit P wishes to make a call, he picks up his handset $C_0$ which automatically closes the normally open contact *r*. A current then flows in the line, its value depending on the line impedance. A voltage appears at a point B on line *b* which is significant of the line current. This voltage can be sampled by a sampling amplifier AP.

The subscriber unit P is provided with a keyboard (not shown) for composing the call-code of the called subscriber. Depression of each key on the keyboard actuates a pair of contacts such as *t* and *t'*, to connect across the wires *a* and *b* a corresponding pair of resistances R and R', each resistance being connected in series with a corresponding diode D or D'. The diodes are oppositely orientated, so that for a particular direction of current flow in the line, only one of the resistances has any effect on the line current. For each direction of line current, a respective voltage is obtained at point B, the voltage depending in each case on the combination of the line impedance and the resistance R or R' as the case may be.

The voltages at point B are passed by the sampling amplifier AP to a discriminator assembly or measuring block BM. A treatment block BT comprises a selector and decoder, and is connected to a memory MAT. The memory is cyclically scanned, and has recorded in it instructions for controlling operation of the apparatus, the operation of the input circuit RI being controlled in accordance with these instructions through an address block or instructor circuit BA.

Figure 1:
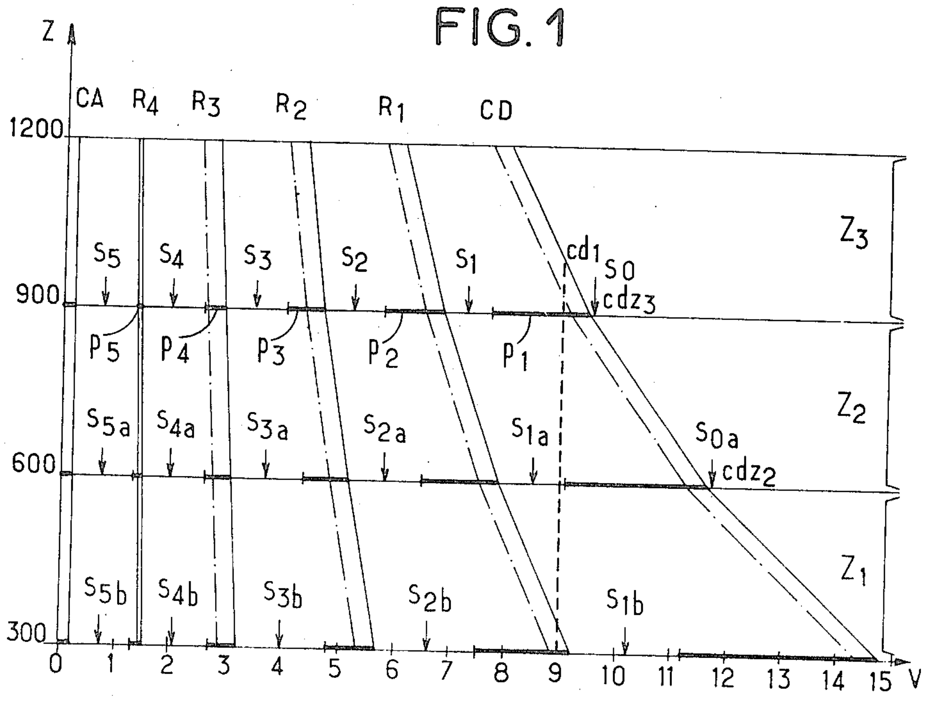
FIG. 1 shows the variation with line impedance Z of a voltage V obtained at a given point on an incoming line.

Referring now to FIG. 1, the line impedance Z is plotted as a function of the voltage V appearing at the point B. The line impedance Z can lie in one of three impedance ranges $Z_1$, $Z_2$, $Z_3$. A curve for the variation of Z with V is shown for each of the four possible values $R_4$, $R_3$, $R_2$ and $R_1$ of the resistances R and R', and also for the two cases where the subscriber's handset is hung up, Ca, and picked up, CD, respectively.

For each line impedance, there are six possible line currents corresponding to the following conditions:

1. Handset hung up CA, the line being interrupted.
2. Resistance value $R_4$ inserted 10,000 ohms for example.
3. Resistance value $R_3$ inserted, 3,900 ohms for example.
4. Resistance value $R_2$ inserted, 1,800 ohms for example.
5. Resistance value $R_1$, inserted, 750 ohms for example.
6. Handset picked up, line closed with no inserted resistance.

If *i* is the line current, then the voltage V at point B is given by $i.\ R_b$.

Assuming that there are no line losses, the condition 1 results in 0 line current and 0 voltage at the point B. The curve of Z against V is coincident with the Z axis. However, if line losses are present, there will be a slight voltage drop across the resistance $R_b$ and a slight voltage at the point B. In this case the curve of Z against V is slightly displaced from the Z axis; as shown in FIG. 1 this results in an area of uncertainty shown by the heavy line on the horizontal lines marking $Z = 600$ and 900 ohms respectively.

In condition 2, the inserted resistance $R_4$ is relatively great in comparison with the line impedance, and the line current is correspondingly small, being slightly larger if losses are taken into account. The resulting area of uncertainty remains very small, and as in condition 1 is practically the same for all line impedances from 300 to 1,200 ohms.

In condition 3, the inserted resistance $R_3$, although less, is still relatively great in comparison with the line impedance. A farily high line current flows, varying with the length of line concerned. Also, when the line current is reversed, the voltage at point B is reduced even with the same resistance value inserted in the line, since the arrangement is not symmetrical. Two curves of Z versus V are shown for condition 3, one by a full line and one by a chain-dotted line. In each of the impedance zones $Z_1$, $Z_2$, $Z_3$, the area of uncertainty extends between the lowest and highest possible voltage V in the range. Each are of uncertainty is shown by a heavy line on the line separating successive impedance zones. It is seen in FIG. 1 that the area of uncertainty increases with decreasing line impedance.

In condition 4, the resistance value $R_2$ is inserted and has a value of the same order of magnitude as the line impedance, providing a higher line current which increases with decreasing line length. Again the reversal of the line current provides a different voltage at the point B, two curves of Z versus V being indicated, with the corresponding areas of uncertainty marked with heavy lines. The voltage obtained at point B varies inversely with the line impedance, being approximately 5.8 volts for a line impedance of 300 ohms, and 4.3 volts for an impedance of 1,200 ohms. The areas of uncertainty are somewhat wider than in the previous conditions, for example, in the impedance range $Z_3$, the insertion of resistance value $R_2$ can provide a voltage at B varying between approximately 4 and 4.7 volts.

In case 5, the inserted resistance value $R_1$ is of the same order of magnitude as a line of medium length, and the line current varies considerably with the line length. In a line of 300 ohms impedance, the voltage obtained at point B is approximately 9.2 volts, while for a 1,200 ohm line the corresponding voltage is approximately 6.1 volts. When the effect of reversing the current is taken into account, areas of uncertainty extending from 5.7 volts to 6.9 volts and from 7.5 volts to 9.3 volts are obtained for 900 ohms and 600 ohm lines respectively.

In condition 6, the handset is picked up, the line is closed by the contact *r* but no resistance is inserted in the line. The areas of uncertainty for a 900 ohm, 600 ohm, and 300 ohm line are 7.1 volts to 9.5 volts, 9.1 volts to 11.6 volts, and 11.2 volts to 14.8 volts, respectively. These areas thus overlap with those of condition 5, and consequently it would be impossible to determine from the voltage measured at point B whether a resistance $R_1$ was inserted in a line having an impedance between 300 and 600 ohms, or whether the handset was picked up without inserted resistance on a line of between 600 and 1,200 ohms.

The doubt is resolved by considering in condition 6, the highest level of resistance. Thus, in the case of a voltage of 9.2 volts at point B, the zone $Z_3$ would be selected rather than the zone $Z_2$ which is equally applicable.

The identification of the resistance value inserted proceeds as follows: first the impedance range in which the line impedance lies is determined, by determining the line resistance immediately the handset $C_0$ is lifted to close contact *r* and before any resistance is inserted into the line to form the code. Once the impedance range has been decided, a dialing tone is sent to the subscriber, who then composes the number. Once the impedance range is known, the first resistance inserted by operation of the keyboard is determined with a given direction of line current, the current then being reversed to determine the other inserted resistance; in each case the line current is sensed by sampling the voltage at point B by means of the sampling amplifier AP.

A reference voltage can be defined between successive areas of uncertainty, and for each of three line impedance values, 900 ohms, 600 ohms and 300 ohms, respectively. At the 900 ohm level, the five highest areas of uncertainty are indicated $P_1$ to $P_5$ respectively, the lowest being unreferenced, a reference voltage $S_1$ lying between the areas $P_1$ and $P_2$, a reference voltage $S_2$ between areas $P_2$ and $P_3$, and so on, a fifth reference voltage $S_5$ lying between the area $P_5$ and the unreferenced lowest area. A further reference voltage $S_0$ lies immediately above the area $P_1$.

Six analogous reference voltages $S_{0a}$ to $S_{5a}$ are defined for the impedance level of 600 ohms. For the 300 ohm level, only five reference voltages are defined, $S_{1b}$ to $S_{5b}$ respectively, there being no upper reference voltage such as $S_0$ or $S_{0a}$. In the zone $Z_3$, a voltage at point B greater than the reference $S_1$ necessarily corresponds to condition 6, that is to say the subscriber's handset is picked up. A voltage between references $S_5$ and $S_4$ necessarily corresponds to the insertion of the resistance $R_4$ a voltage between references $S_4$ and $S_3$ corresponds to the insertion of $R_3$, between $S_3$ and $S_2$ to the insertion of $R_2$, between $S_2$ and $S_1$ to the insertion of $R_1$. A voltage below reference $S_5$ necessarily corresponds to condition 1, that is to say the handset of the subscriber being hung up.

The six conditions are correspondingly defined by the reference voltages of zone $Z_2$ and zone $Z_1$.

It should be noted that the voltage sampled on the line is taken in the uncertainty area lying immediately to the right of a reference potential when the impedance range is to be determined. The voltage at the point B with no resistance inserted by the keyboard device lies in one of the zones $Z_1$, $Z_2$, or $Z_3$, the particular zone being identified by a comparison with the reference voltages $S_0$ and $S_{0a}$.

The voltages sampled on the line at point B are compared with the seventeen reference voltages S, and seventeen threshold circuits are provided in the apparatus for this purpose.

The first comparison serves to determine the impedance zone $Z_1$, $Z_2$ or $Z_3$ and is made with the line closed with a first direction of line current flow. The corresponding curve of FIG. 1 is that shown by a full line at CD, the reference voltages $S_0$ and $S_{0a}$ lying at the intersections of this curve with the 900 and 600 ohm levels respectively. A slight ambiguity can arise in the neighbourhood of these two points of reference, but its effect can be eliminated by suitable selection of the thresholds for $S_1$, $S_{1a}$, and $S_{1b}$.

Once the impedance range has been determined, further monitoring of the current is restricted to that range, employing only the threshold circuits associated with it.

Figure 2:
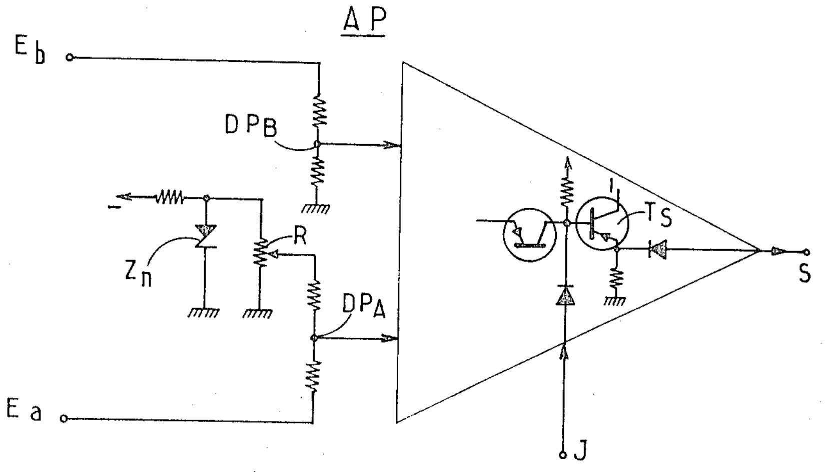
FIG. 2 is a simplified schematic of a sampling amplifier connected to the line.

Referring to FIG. 2, the sampling amplifier AP shown in FIG. 5 is shown in more detail. A first input $E_b$ is connected to the point B on the line. The voltage appearing at point A is applied to the input of the amplifier proper through a first potential divider $DP_B$. A second input $E_a$ is held at a fixed reference potential and is connected to one end of a potential divider $DP_A$. The other end of the divider $DP_A$ is connected to the tap of a variable resistance R shunting a zener diode $Z_n$. The zener diode $Z_n$ provides a stabilized reference potential across the resistance R, a portion of this potential being applied through the tap to the other end of the potential divider $DP_A$. A second input of the amplifier proper is connected to the tap of the potential divider $DP_A$ and is thus held at a reference potential which can be adjusted by adjustment of the variable resistance R. The output of the amplifier is supplied to a terminal S through an emitter-follower transistor $T_S$. An inhibit input J of the amplifier is connected to the base of the transistor $T_S$ and the application of an inhibit signal in the form of a 0 voltage at the input J prevents transfer of the amplifier input signal to the terminal S. Thus, although the amplifier AP is permanently connected to the line, the line voltage may be periodically sampled by removing the inhibit signal from input J.

The arrangement of the sampling amplifier, including the potential dividers DP enables the voltage obtained at the point B to be transposed to a suitable level, and also offers protection to the electronic circuitry.

Figure 3:
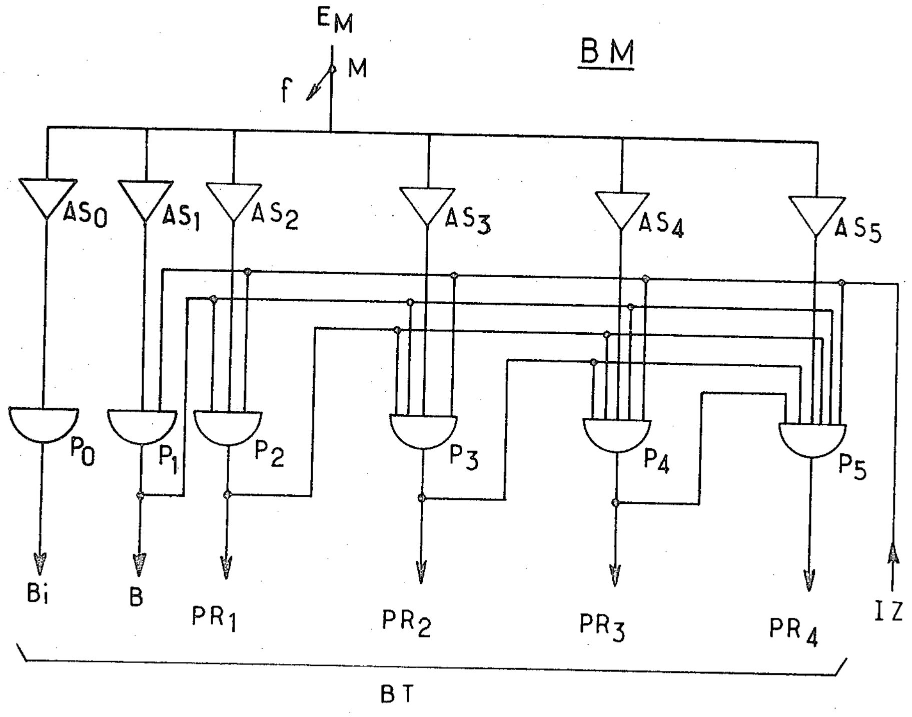
FIG. 3 shows part of a discriminator assembly.

Referring to FIG. 3, part of the discriminator assembly or measuring block BM includes six threshold circuits $AS_0$ to $AS_5$ respectively. The thresholds of these circuits correspond to the reference potentials $S_0$ to $S_5$ respectively. Similar assemblies of threshold circuits are provided for the reference potentials $S_{0a}$ to $S_{5a}$, and $S_{1b}$ to $S_{5b}$ respectively.

All the threshold circuits have their inputs connected together and to the discriminator assembly input $E_M$. This input is connected to the output of the sampling amplifier AP of each input circuit RI.

The output of each threshold circuit is connected to one input of an associated NAND-gate, the gates for threshold circuits $AS_0$ to $AS_5$ being respectively $P_0$ to $P_5$. These five gates $P_0$ to $P_5$ represent the reference potentials $S_0$ to $S_5$ respectively. A second input of each gate, with the exception of the gate $P_0$, is connected to an inhibit input IZ which can receive an inhibit signal to block all the corresponding gates. Further, the output of each of the gates $P_1$ and $P_4$ is connected to an input of each of the following gates, to ensure that the only threshold circuit energized for a particular voltage at the point B is the one whose threshold voltage is immediately below that voltage. Thus for example if the circuit $AS_2$ is energized by a voltage at the point B, the circuits $AS_3$, $AS_4$ and $AS_5$ are also energized, but only the NAND-gate $P_2$ provides an output. The outputs of the gates $P_0$ to $P_5$ are indicated $B_i$, B, and $PR_1$ to $PR_4$ respectively, and are all linked to the treatment block BT, as are the corresponding outputs of the remaining discriminators of the discriminator assembly.

FIG. 3 shows the discriminator $M_3$ corresponding to impedance zone $Z_3$. The other assemblies of threshold circuits form two further discriminators $M_2$ and $M_1$ respectively corresponding to the impedance zones $Z_2$ and $Z_1$. The determination of the impedance zone of the line is obtained by means of the outputs $P_0$ and $P_{0a}$ of the discriminators $M_3$ and $M_2$ respectively. Once the zone is determined, the discriminators corresponding to the remaining two zones are blocked by the application of an inhibit signal on their respective inhibit inputs IZ. Further discrimination then takes place with the threshold circuits of the single remaining discriminator.

Figure 4:
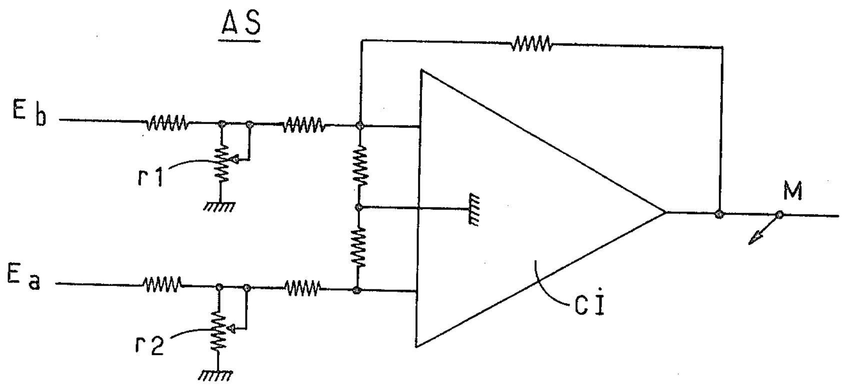
FIG. 4 is a simplified schematic of a threshold circuit for use in the circuitry shown in FIG. 3.

FIG. 4 shows the arrangement used for each of the threshold circuits AS. It comprises an amplifier in the form of an integrated circuit CI, having a first input $E_b$ connected to receive the voltage sampled at the point B of the line, and a second input $E_a$ connected to receive one of the reference potentials S. Each input line of the amplifier includes a rheostat, $r_1$ and $r_2$ respectively for adjusting the corresponding input potentials. Each circuit thus provides a comparison between the instantaneous voltage at point B arising on input $E_b$ and the corresponding reference obtained at the input $E_a$.

Referring again to FIG. 5, the sampling amplifier AP has its output connected to the input of the discriminator assembly BM. The output of the latter is connected to an input of the combined selector and decoder BT, one of whose outputs is connected to the discriminator assembly BM to select one of the three discriminators $M_1$, $M_2$, $M_3$ in accordance with the line impedance range $Z_1$, $Z_2$ or $Z_3$ indicated by the discriminator assembly BM before the code is transmitted. A further output of the combined selector and decoder BT is connected to a further input of the monostable MO whose first input is connected to the output of the instructor circuit BA.

A third output of the combined selector and decoder BT is connected to the input of the memory MAT. The memory is scanned cyclically and includes a number of lines $L_1$, $L_2$, $L_3$ and so on for each input circuit RI. Each of the lines L carries magnetic cores grouped in fours for storing or recording information.

On the line $L_1$ there are four groups of four cores, indicated PZ, SEQ, LD, and NOR respectively. Line $L_2$ has four groups of four cores indicated $C_1$ to $C_4$ respectively, in which can be recorded successive digits of the dial code transmitted to the input circuit RI by the subscriber P. The line $L_3$ can be used for further digits if necessary.

The line $L_1$ stores instructions for controlling the operation of the apparatus. In the group PZ, the four cores respectively store:

1. A program $\pi_1$ corresponding to the line impedance range determination.
2. Program $\pi_2$ corresponding to the impedance zone $Z_1$.
3. Program $\pi_3$ corresponding to the impedance zone $Z_2$.
4. Program $\pi_4$ corresponding to the zone $Z_3$.

The first three cores of the group SEQ respectively correspond to:

1. Sequence SO, determination of the first coding resistance before current reversal.
2. Sequence S1 determination of the second coding resistance after current reversal.
3. Sequence S2, delay for release of the depressed key.

The group SEQ thus provides an indication of the progress of the code determination.

The cores of the group LD correspond respectively to the reading of the four resistance values $R_1$ to $R_4$. They record the first of the two resistances corresponding to a code digit.

The four cores of the group NOR serve to indicate the number of the code digit under consideration at any given time in the case of codes having more than one digit.

Thus the line $L_1$ provides at any instant an indication of the progress of the determination of the code digit, together with the place of the digit in the code. As soon as the digit is determined, it is stored in either of the lines $L_2$ or $L_3$ in one of the groups such as $C_1$. As each digit is recorded, the indication of the group NOR is increased by one.

The end connection of the various input circuits RI and the common memory MAT is provided by the instructor circuit BA linked to an arrangement C of the memory serving to scan the lines L. As the line $L_1$ is scanned, the sampling amplifier AP is energized to supply the voltage appearing at point B to the discriminator assembly BM.

When an input circuit RI is engaged, by the subscriber P commencing his call, the instructions stored in line $L_1$ first provide the identification of the line impedance range $Z_1$, $Z_2$ or $Z_3$. The subscriber's line is closed, the voltage sampled by the amplifier AP being that corresponding to the looped line without inserted impedance, serving to identify the impedance zone, the identification being carried out by the discriminator assembly BM. The result is recorded in the group PZ of the line $L_1$. The first coding resistance is then determined, the line impedance range being supplied to the selector BT by a read-out amplifier AL and one of the discriminators $M_1$ to $M_3$ of the assembly BM being selected in accordance with this information. As the group SEQ is scanned, the line current is reversed by the monostable MO on an instruction received from the instructor circuit BA but coming in turn from the memory MAT through the circuit C.

The selected discriminator of the assembly BM provides an indication of the voltage appearing at the point B for each of the resistances inserted into the line for a particular code digit. These indications are supplied to the decoder BT which determines the code from them, and inserts the code into the memory MAT.

The combined selector and decoder BT also permits the decoding of program instructions, the recording of the line impedance range, the transmission to the discriminator assembly of the range, and inversion. It records and compares the values obtained, all these conventional functions being obtained by networks of NOR-gates.

As a specific example of the operation of the apparatus, a description will now be given of the sequence of events occurring when the subscriber P forms the code 691. The subscriber starts by lifting his handset $C_0$. This closes the contact *r* and a line current flows depending on the line impedance. The subscriber is connected to the input circuit RI through pre-selector circuitry of the exchange, the line current being supplied to the invertor INV of the input circuit. Once this connection has been established, the cyclical sampling of the voltage at point B being made in turn on all input circuits such as RI, the program $\pi_1$ is automatically carried out. On the following cycle, the program $\pi_1$ causes the interrogation of the threshold circuits $AS_1$, $AS_0$ of the discriminator $M_3$, and the threshold circuit $AS_{0a}$ of the discriminator $M_2$. The line being closed without any inserted resistance, the line impedance range $Z_1$, $Z_2$, or $Z_3$ is identified. Assuming that the subscriber P has a line in the range $Z_2$, the program $\pi_1$ is erased from the group PZ and the program $\pi_3$ is written in instead. In each successive cycle, the program $\pi_3$ blocks the discriminators $M_1$ and $M_3$, these being inappropriate to the line impedance range $Z_2$.

The dialing tone is then sent to the subscriber who presses the first key indexed 6; the digit 6 is represented by a combination of resistances $R_3$ and $R_4$. The determination of the first resistance $R_3$ is carried out by the discriminator $M_2$ in the sequence SO of the group SEQ. $R_3$ is recorded in the group LD, the sequences S1 is marked up, and the instruction for reversal of the line current is given.

In the following cycle, the determination of the resistance $R_4$ is made by the discriminator $M_2$ on the sequence S1 in group SEQ. The decoding of the code digit corresponding to the combination $R_3$, $R_4$ is made partly from the value $R_3$ recorded in the group LD and partly from the value $R_4$ then obtained from the discriminator $M_2$. The digit 6 is decoded and recorded in binary coded form on the group $C_1$ of line $L_2$. The sequence S2 is then marked up, corresponding to the delay for the release of the depressed key by the subscriber. When the key is released, the sequence SO is again marked up ready for the second digit of the code, and the indication "1" is inserted in the group NOR, indicating the reception of the first digit.

The key indexed 9 is then depressed. The resistance combination is $R_3$, $R_3$. In a similar way to that just described, the sequence SO permits reading of $R_3$ and the sequence S1 of the reading of $R_3$ after reversal of the line current. The digit 9 is then decoded and registered in group $C_2$ of the line $L_2$ of the memory MAT. The indication of the group NOR is increased to 2 to indicate reception of the second digit, and the sequence SO is again marked up ready for the third digit.

This digit is represented by the combination $R_1$, $R_2$ the digit is decoded and recorded in group $C_3$ of the memory MAT by a precisely similar process, and the indication of the group NOR is increased to 3. The sequence SO is again marked up, the code 691 transmitted by the subscriber being held in line $L_2$ of the memory. The recorded code can be used as required, generally for connecting the subscriber P to the called subscriber and logging the call for charging purposes.

Among possible modifications and adaptations of the arrangement just described are the following: While the line current has been sampled by means of an amplifier AP connected to one wire of the line to sense the line voltage, it is equally possible to connect a differential amplifier between the wires of the line to provide an indication of the voltage between two points on the line.

The amplifier AP could be formed by a magnetic amplifier a Hall effect device, or other suitable element capable of transmitting a continuous signal voltage.

Logic circuitry can be connected between the sampling amplifier AP and the discriminator assembly BM, permitting compensation of the affects of varying supply voltage, compensation of the effect of the line current reversal on the voltage at point B, and compensation of variations due to the asymmetric nature of the lines with respect to the supplies.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What we claim is:

1. Exchange equipment for a telecommunications network in which call-codes are transmitted by impedance variations from keyboards of the network subscribers, each key of a subscriber keyboard being associated with a pair of impedances successively connectable into the line to provide two successive, oppositely directed and unidirectional line currents whose values depend on the impedance values and provide a coded indication of a code digit represented by the key, the subscriber keyboards being connected to the exchange equipment upon lifting of a handset through lines each having an impedance lying within one of at least three preselected ranges, the exchange equipment comprising detecting means for carrying out a preliminary determination of the line impedance range after the subscriber's handset is lifted but before the call-code is composed by the subscriber, and a plurality of measuring elements corresponding to categories of the various line impedance ranges and operating in parallel, each measuring element including individual comparators respectively adapted to levels of the different line categories.

2. Exchange equipment as claimed in claim 1, wherein the three line impedance ranges include a first range from 300–600 ohms, a second range from 600–900 ohms, and a third range from 900–1,200 ohms, respectively, said plurality of measuring elements including three measurement blocks comprising three threshold comparators respectively adapted to the three line categories, each measurement block including five of said individual comparators corresponding to five intervals determined by the coding impedances and lying between the maximum line impedance and minimum line impedance, corresponding to the subscriber's handset being hooked and unhooked respectively.

3. Exchange equipment as claimed in claim 1, the exchange including individual receivers connected to the subscriber lines through preselector circuitry whereby the number of individual receivers is less than the number of subscribers, the exchange further including an arrangement for the treatment of data provided by the individual receivers including said detecting means and said plurality of measuring elements, the arrangement being common to more than one individual receiver, said detecting means including a direct current amplifier for sampling the voltage at a point on the subscriber line by rapid sampling, and an invertor controlled by a monostable multivibrator to provide the reversal of the line current, the voltage sampling being performed cyclically on all individual receivers, and the treatment of the sampled voltage being carried out by the common arrangement.

4. Exchange equipment as claimed in claim 3, including a matrix memory having a preselected number of lines corresponding to each individual receiver, all individual receivers of the equipment being represented in the memory, the memory being cyclically scanned and being provided with means for reading out of and into the memory data significant of each individual receiver so that at a given instant the state of the memory provides an indication of the stage reached in a code detection process.

5. Exchange equipment as claimed in claim 3, wherein the common arrangement includes measurement means controlled by a central logic circuit and including a central matrix having program cores and read-in cores for measuring and storing the resistance of the line in the form of code digits, the central logic circuit being connected to said measurement means which is connected to an individual receiver, the code digits composed by the subscriber making a call being transmitted by the individual receiver, an address block and treatment means for decoding the call-code into code digits to be stored in said central matrix.

6. Exchange equipment as claimed in claim 5, wherein said measurement means is connected to an individual receiver to receive a sampled voltage between the wires at three different periods in the communication, namely at the time the subscriber's handset is lifted, after operation of a key on the keyboard and before reversal of the line current, and after reversal of the line current, the subscriber lines being divided into three categories according to their own impedances, in each category six voltage levels of which one corresponds to a line without an inserted resistance, four correspond respectively to the four values of resistance which can be inserted in the line, and one corresponds to the open line, said measurement means comprising three measurement blocks corresponding to the three categories, each measurement block being formed by six threshold circuits corresponding to the six voltage levels, the three measurement blocks being connected in parallel to the individual receiver so that the first sampled voltage provides a determination of which of the three measuring blocks is to be used for determining the two resistances inserted into the line by the operation of the key in accordance with the second and third sampled voltages, thus permitting decoding of the corresponding code digit.

7. Exchange equipment as claimed in claim 6, the individual receiver including said sampling amplifier having a first input connected to one wire of the line and to a point at ground potential through a resistance, a second input connected to receive a fixed reference potential and also to a potential divider, inhibit means for cutting off an output transistor of the amplifier in response to an inhibit signal on an inhibit input, an output linked to the measurement block providing an output value significant of the voltages sampled on the line, the sampling amplifier being blocked while the inhibit signal is present, the voltage sampling carried out on the line being transmitted to the output by cyclical sampling according to a suitable range of values when the inhibit signal disappears.

8. Exchange equipment according to claim 6, wherein a measurement block includes several threshold circuits whose inputs are connected in parallel, each threshold circuit being associated with an NAND-gate and including an amplifier having two inputs, a first input being connected to receive an adjustable reference potential, each threshold circuit of the measurement block being set to a different reference potential, the output of each amplifier being connected to the input of a gate and the output of a gate of order $n$ being connected to an inhibit input of all the other gates of the measurement block corresponding to reference potentials of higher order than $n$, an inhibit voltage being connectable simultaneously on all the gates with the exception of that gate corresponding to the sampling amplifier of the loop voltage obtained with the handset lifted but without resistance inserted into the line, a single gate output of the comparator being energized at any particular moment so that for a given measuring block, a single indication is given corresponding to a given voltage level and thus to a certain inserted resistance value, the two measuring blocks corresponding to the two zones not involved in the measurement taking place at that instant being blocked by general inhibit signals.

9. Exchange equipment as claimed in claim 6, wherein the central matrix memory comprises counters connected to said address block, read-out amplifiers and lines of cores, the counters being controlled by a monostable multivibrator, the first line of cores including several groups of four cores, the first group being associated with the impedance zone determination, the second group with the determination of the sequence taking place, the third group with the reading of an inserted resistance before reversal of the line current, and the fourth group with a number significant of the position in the code of the digit; the different digits composed by the subscriber being written successively in second and third lines of cores, the counters being connected to successively interrogate all the individual receivers through the address block, so that at a given moment, a particular state of each group of cores corresponds to a subscriber in the process of dialing, the aggregate of the states of the different groups of cores identifying the precise stage of dialing attained, several communications being simultaneously observable as to its current state, the data relating to each communication being completed in successive sampling cycles until the complete numbers are obtained in the matrix for subsequent utilization.

10. Exchange equipment according to claim 9, wherein between said sampling amplifier of the individual receivers and said measurement means logical adders are provided to compensate voltage differences due to the asymmetrical nature of the line with the opposed current flow directions for an identical value of inserted resistance.

* * * * *